United States Patent [19]
Morabit et al.

[11] Patent Number: 5,761,816
[45] Date of Patent: Jun. 9, 1998

[54] AERODYNAMIC CUTTING STRING

[76] Inventors: Vincent D. Morabit, 1230 Wendy Rd., Rock Hill, S.C. 29732; Michael Z. Morabito, 136 Reid St.; Christopher J. Morabito, 654 E. Main St., both of Rock Hill, S.C. 29730

[21] Appl. No.: 656,485

[22] Filed: May 31, 1996

[51] Int. Cl.$^6$ ............................................. B26B 7/00
[52] U.S. Cl. ........................ 30/276; 30/347; 428/397
[58] Field of Search ................ 30/276, 347; 428/364, 428/397, 399

[56] References Cited

U.S. PATENT DOCUMENTS

| | | | |
|---|---|---|---|
| 4,054,993 | 10/1977 | Kamp et al. | 30/276 |
| 4,186,239 | 1/1980 | Mize et al. | 428/399 |
| 4,188,865 | 2/1978 | Jacyno et al. | 30/276 |
| 4,366,622 | 1/1983 | Lombard | 30/276 |
| 4,566,189 | 1/1986 | Muto | 30/276 |
| 4,571,831 | 2/1986 | White, III | 30/276 |
| 4,869,055 | 9/1989 | Mickelson | 30/276 |
| 4,905,465 | 3/1990 | Jones et al. | 30/276 |
| 5,048,278 | 9/1991 | Jones et al. | 30/347 |
| 5,220,774 | 6/1993 | Harbeke et al. | 30/276 |
| 5,424,128 | 6/1995 | Fogle | 428/399 |
| 5,524,350 | 6/1996 | Boland | 30/347 |

Primary Examiner—Hwei-Siu Payer
Attorney, Agent, or Firm—Nixon & Vanderhye P.C.

[57] ABSTRACT

An aerodynamic cutting string for use with such devices as flexible line trimmers and the like. The string incorporates a number of embodiments which eliminates or greatly reduces the drag, fluttering and force imbalances which are created as a result of the pressure differential and wake which are formed behind the flexible line as it moves. This accomplishment is achieved by employing an aerodynamic profile for the line which lowers the coefficient of drag and reduces the forces created by the air foil.

9 Claims, 13 Drawing Sheets

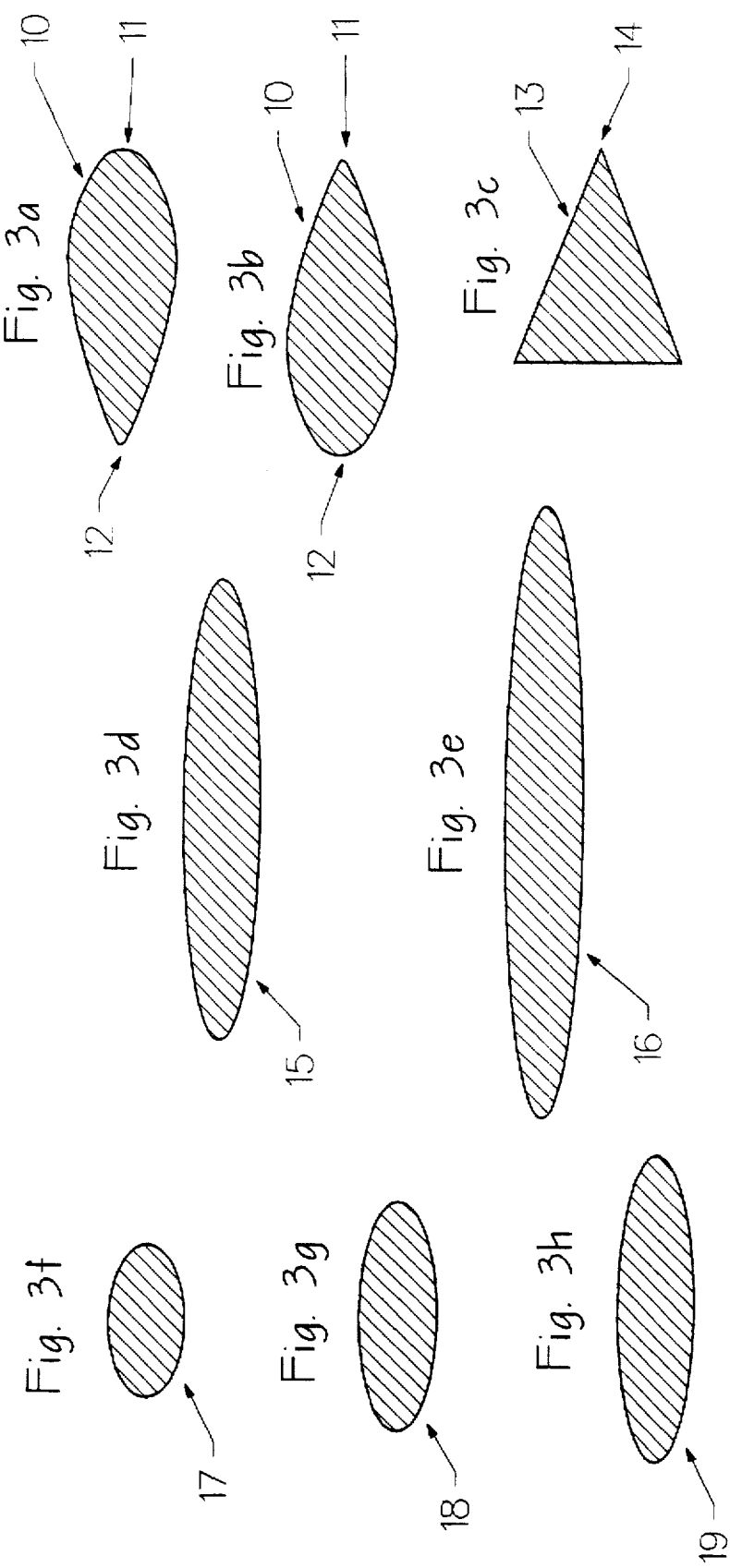

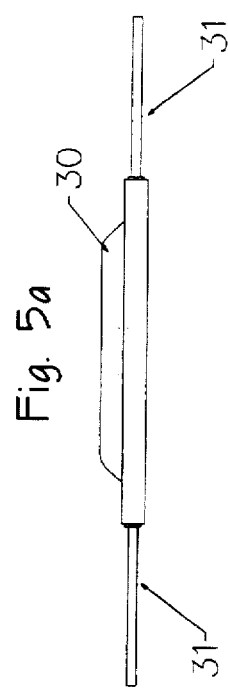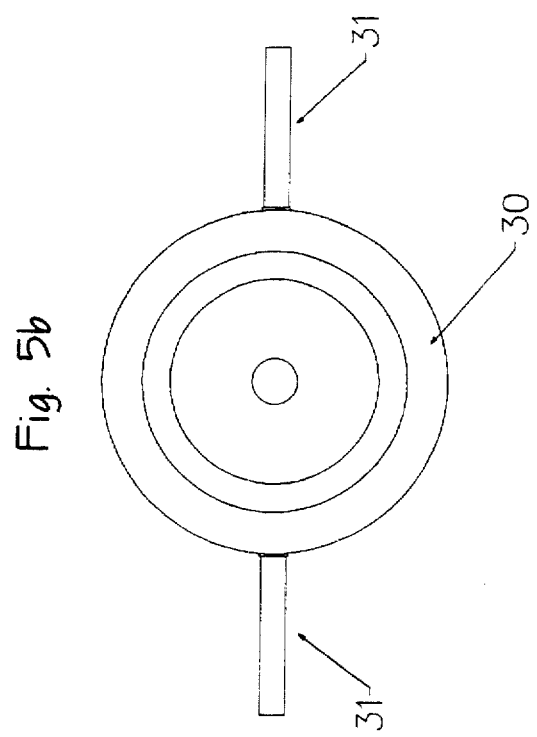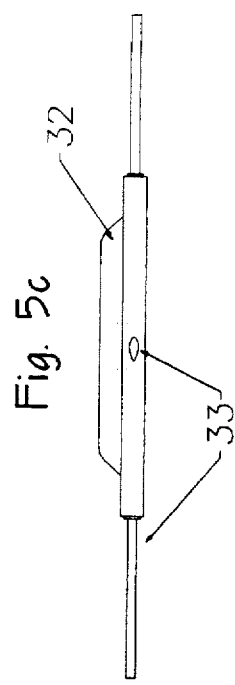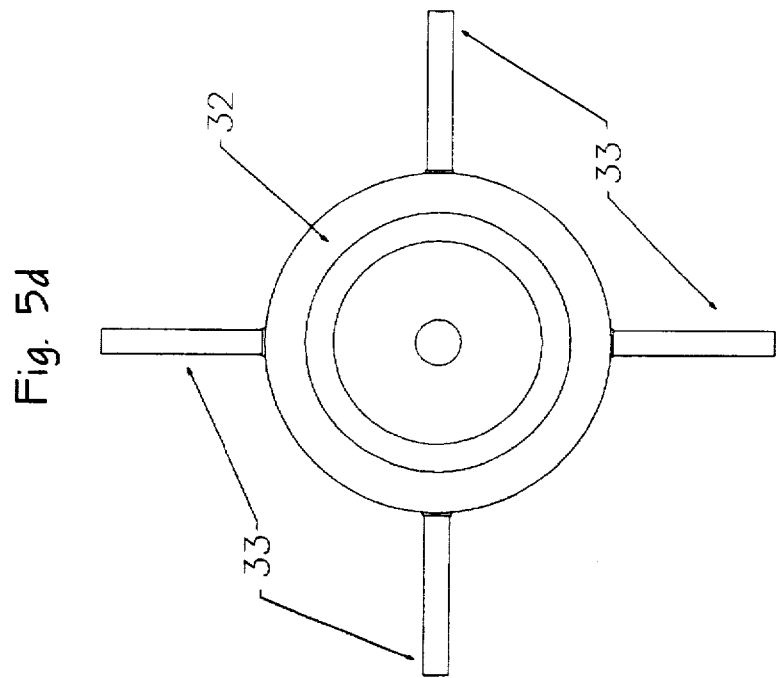

AERODYNAMIC CUTTING STRING

BACKGROUND OF THE INVENTION

The present invention generally relates to the field of lawn care, grass and weed cutting apparatus and more particularly, is directed to an aerodynamic cutting string for use with such devices as flexible line trimmers and the like.

Heretofore, there have been many cutting methods and devices for maintaining well-manicured lawns and grass areas, particularly adjacent buildings, fence lines and other obstacles protruding from the turf above the grass to be cut. Maintaining grass and weed areas along roadways, embankments and generally uneven surfaces also present particular problems to those responsible for their maintenance.

Present-day grass and weed cutting tools have not been without difficulties in that they are laborious and time consuming to use. Such tools include manually operated shear disk and scissor type devices mounted on extended handles. In other prior art cutting tools, a gasoline engine or electric motor is assembled to a wheeled frame and is used to drive a rotating blade in a vertical or inclined plane for cutting grass and weeds, particularly along the sides of buildings. Such a tool is expensive and can be dangerous to operate.

The availability of small electric motors and gasoline engines have lead to the development of improved grass cutting tools. Many of the tools take the form of a high speed rotating metal blade or flexible cutting line mounted on an extended handle. The so-called flexible line trimmers employ the use of flexible cutting line intended to cut grass, weeds, and vines in areas not intended or not possible for such devices as the walk-behind or ride-on lawn mower.

Through years of development, Original Equipment Manufacturers have developed flexible line cutters into one of the most widely used tools for grass cutting and care. Prior art flexible cutting line for flexible line trimmers include several attempts at providing a means to more efficiently, and cleanly, cut grass and weeds by providing round, star, triangle, and indented rectangle shaped cutting line, none of which employ the concept of aerodynamic maximization.

U.S. Pat. No. 4,186,239 to Mize, et al. illustrates in one embodiment a somewhat cross-shaped configuration for string trimmer line. However, in the Mize approach, the ends of the lobes in the cross-section are rounded, again engaging a work piece with a circular surface, and providing no aerodynamic benefits.

U.S. Pat. No. 4,118,865 to Jacyno, et al., illustrates in one embodiment a line with a triangular cross section. However, the regions between the edges on the line are flat and thus it is possible for a flat section of the line to engage the material to be cut which does not provide the most efficient cutting.

U.S. Pat. No. 4,869,005 to Mickelson, et al., illustrates both the star and indented rectangular cutting line. This was intended to provide a sharp cutting surface wherever contact is made to grass by indenting the flat surfaces so that the sharp surfaces will hit the grass and weeds first, but does not provide any aerodynamic cross-sectional properties nor advantages provided by aerodynamic cross-sectioned cutting line.

The wetted surface area facing the air flow and total contour plays an important role in how air flows over a rotating cutting line. As the string is rotated, a laminar flow is created, with a disruptive zone at the trailing side of the cutting edge of the line. The disruptive zone includes a pressure differential, and further creates a wake which leaves behind eddy disturbances for the next string to flow through. The pressure differential, in essence, pulls the string backwards. The engine attempts to propel the string forward but the pressure differential negates a portion of the energy due to the creation of a separating type air foil from its boundary. Further, the eddy's and turbulent and/or laminar conditions created by the wake trailing the cutting line add additional forces to the forward entry path of the next forward moving line.

Thus, Applicants have discovered that air drag and subsequent flow conditions play an important role in cutting efficiency and fuel usage in line cutting devices. Higher air drag and disturbed flow conditions leads to lower tip speed, lower fuel efficiency, and erratic line bending because more power has to be exerted in order to maintain proper cutting speed. Air drag increases as the line size increases from 0.050" to 0.130", and higher, but increases even more dramatically when sharper shapes such as square, star and cross lines are used. Therefore, as size increases and shape changes to more square or sharper cutting lines, the fuel efficiency further decreases, and the fuel usage increases In contrast, by reducing the air drag on the string, speed will increase, as will fuel efficiency.

Further, Applicants have discovered that this invention, aside from its aerodynamic improvements, creates additional benefits in reducing wear (a longer wearing surface compared to conventional line), increasing stiffness (a longer, more structural beam in the operating direction which increases the moment of inertia (I) of the formula-stress=Moment★c/I), and a sharper cutting surface than circular shaped cutting line.

Thus, there is a need in the art for an improved cutting string for flexible line cutting and trimming.

SUMMARY OF THE INVENTION

Accordingly, it is the overall object of the present invention to provide a cutting string which overcomes the above noted disadvantages of such strings known in the prior art.

It is a specific object of the present invention to provide a cutting string which has improved aerodynamic operation over such strings known in the prior art.

It is a specific object of the present invention to provide a cutting string which has improved durability by reducing wear over such strings known in the prior art.

It is another object of the present invention to provide a cutting string having the above advantages which also is easy to use, low in cost, and reduces cost.

It is another object of the present invention to provide a cutting string having the above advantages which also is easy to manufacture.

These and other objects are achieved by the aerodynamic cutting string of the present invention. The invention incorporates a number of embodiments which eliminates or greatly reduces the drag, fluttering and force imbalances which are created as a result of the pressure differential and wake which are formed behind the flexible line as it moves. This accomplishment is achieved by employing an aerodynamic profile for the line which lowers the coefficient of drag and reduces the forces created by the air foil. The invention also encompasses related components, such as the rotating head, the eyelet and string spool.

The present invention can be used with continuous length flexible lines, flexible lines formed of aerodynamic connecting links, pre-cut lengths of flexible line and/or other moving, less flexible, cutting attachments. In addition, the aerodynamic cutting string of the present invention can be employed with single, double, triple, quadruple or multiple line heads of any given diameter.

BRIEF DESCRIPTION OF THE DRAWINGS

FIGS. 3a–3h illustrates cross-sectional views of various shapes and sizes of an aerodynamic string in accordance with the present invention;

FIGS. 5a–5d and 6a–6d illustrate preset line cartridges which employ an aerodynamic string in accordance with the present invention;

DETAILED DESCRIPTION OF THE PREFERRED EMBODIMENT

Figure 1:
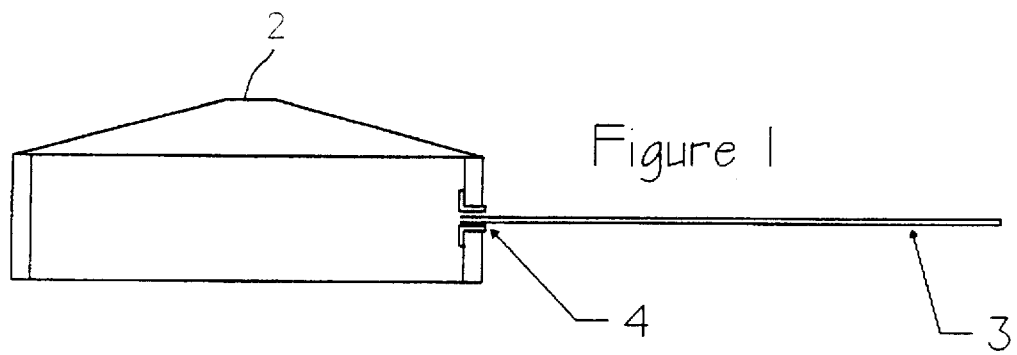
FIGS. 1 and 2 are side and bottom views illustrating the overall construction of a string trimmer and spool head.

The present invention incorporates the design of the cross sections of the flexible cutting line to be shaped in such a manner so as to reduce or minimize the effects of aerodynamic drag, vortex and eddy disturbances, and/or force imbalances which tend to de-stabilize the flexible line during rotation, thus creating instability. Linear velocities of such a rotating flexible cutting line vary in certain locations along the line. Accordingly, the cross section of the cutting line can vary to maximize the intended benefits at various speeds and locations.

Various styles of elliptical cross sections of the line create an assortment of sharper cutting edges. Such a design is in contrast to the hemisphere shape of a circular cutting line. The grass and weeds that are cut by the line are cut smoother and easier at lower speeds and the line itself, due to the substantially reduced resistance and longer length member in the cutting plane, will last longer than circular cutting line.

In accordance with the present invention, the leading edge of the flexible line can be controlled by its positioning through the eyelet of the rotating cutting head. Therefore, the eyelet can be shaped to the same cross-sectional design (with sufficient clearance) to allow the flexible line to pass through for feeding. This can be done with either single or multiple lines.

The surface along the axis of the flexible line is specially modified to produce further stability as the line moves rapidly through the air. Recessed or elevated ribs also can be added to help straighten air flow and reduce turbulence.

The retaining spool which holds pre-wound string is also designed to accept the various flexible line cross-sections in such a manner to help feed and keep it oriented toward its intended direction, either in part or in combination with the eyelet cross-section. Any combination can achieve its intended exposure to the air by control at the eyelet discharge. The eyelet at the discharge is also designed to change its orientation so as to allow the line pitch to be adjusted and feathered to a preferred or more desirable position.

The string of the present invention is made of either a continuous piece of flexible line or in components such as with aerodynamic links. With the link design, variable modifications can be made to the cross-sectional areas as it would be exposed to the air, so as to meet different velocity conditions along the outward radius of the rotating flexible string. Such a construction also accommodates for varying velocities along the length of the cutting unit.

The same concepts can be applied to present-day string advance mechanisms and cutoff knives which would trim the excess line after advancing has been made to the desired cutting length.

The advantages of aerodynamic string of the present invention is that it utilizes the best principles associated with reducing dynamic air drag, turbulence, imbalanced forces, flexible line resonance, among other factors. These imbalances are eliminated, or greatly reduced, by the design of the cutting line cross-section, which results in lower pressure differential, reduction or elimination of wake disturbances, smoother operation, lower power required, and much greater operating efficiency. Therefore, more grass and weeds can be cut with less fuel or energy required while the operator experiences more comfort and less fatigue. The present invention also has the advantage of reducing stress to the line itself, therefore resulting in longer cutting life.

Applicants' cutting string is designed to reduce air drag and fuel use, while at the same time maintaining cutting efficiency and durability Since 1987, 30 million string trimmer and brush cutter units have been sold. A conservative estimate would be that 50% of these are still in use today, or 15 million, and they use flexible line as a cutting medium. If, for example, these 15 million homeowners use trimmers with aerodynamic strings which incorporate the present invention 30 minutes per week during summer months (16 weeks) and that the aerodynamic string saves an average of two fuel ounces per 30 minutes of use, a savings of 480 million ounces, or 3.75 million gallons of fuel, would result.

The aerodynamic string of the present invention also provides an additional benefit to flexible line cutter manufacturers. The addition of Applicants' string to present string cutting lines would increase cutting speed and overall cutting performance. As explained above, Applicants' string greatly reduces air drag, allowing the use of lower horsepower engines. Thus, OEMs could cut manufacturing cost by providing lower horsepower engines while at the same time maintaining or increasing cutting efficiency, and reducing noise attributed to higher horsepower, higher speeding engines, and noise created by the string itself. Accordingly, the use of Applicants' invention results in a lighter weight, more quiet and compact cutting device compared to today's trimmer that uses conventionally designed cutting line.

The invention will now be described with reference to the appended drawings.

Figure 2:
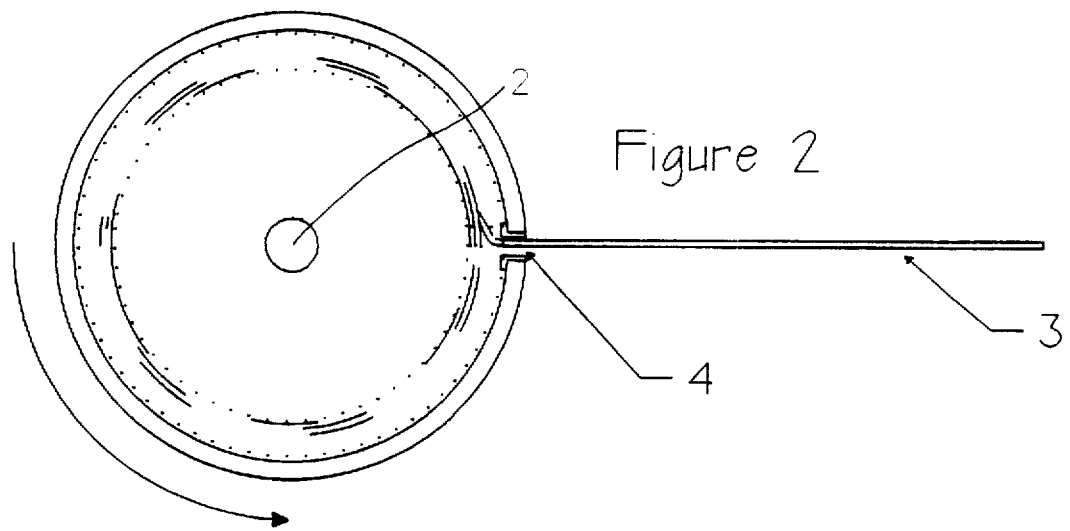

FIGS. 1 and 2 illustrate the overall construction of a string trimmer head assembly. The trimmer head assembly includes a rotating head which is rotatable about shaft 2 via a bearing assembly (not shown) as is well known in the prior art. The bearing assembly provides relatively friction-free rotation of head about shaft 2. Included within head is a supply of trimmer string 3 which projects from head via eyelet 4.

5

FIGS. 3a–3h illustrate various shapes and sizes of the aerodynamic cutting string of Applicants' invention. Selection of the optimum shape and size for minimized drag and maximum cutting efficiency and durability will depend on the size of the trimmer motor and the particular cutting operation to be performed.

FIG. 3a shows a cutting string 10 having a tear drop configuration, with a leading, cutting, edge 11 and a trailing edge 12. FIG. 3b shows a cutting line 10 having the same tear drop configuration of FIG. 3a only in reverse, the cutting edge 11 being the more tapered edge while the trailing edge 12 is a larger edge, compared to the FIG. 3a configuration. FIG. 3c shows a triangle cross-section of the cutting string having a cutting edge 14. FIG. 3d shows a 6:1 ellipse cross-section cutting string 15. FIG. 3e shows an 8:1 elliptical cross-section cutting string 16. FIG. 3f shows a 2:1 ellipse cross-section of the cutting string 17. FIG. 3g shows a 3:1 ellipse cross-section cutting string 18, and FIG. 3h shows a 4:1 ellipse cross-section cutting string 19.

Each size and shape of string 10–19 corresponds to a particular size and shape of an eyelet as illustrated in FIGS. 4a–4h, respectively. In this regard, each eyelet is designed so that it can be easily removed from trimmer head and replaced with a different eyelet which matches the string to be used.

Figure 4F:
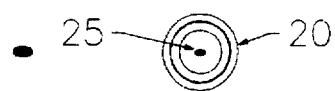
FIGS. 4a–4h illustrates mating trimmer head exit port eyelets which correspond to the aerodynamic string shapes and sizes illustrated in FIG. 3.
Figure 4G:
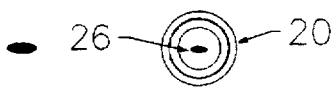
Figure 4H:
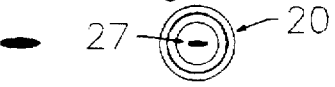
Figure 4D:
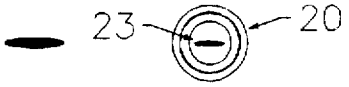
Figure 4E:
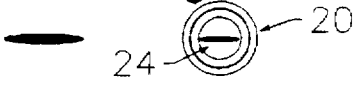
Figure 4A:
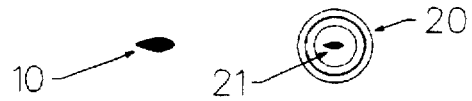
Figure 4B:
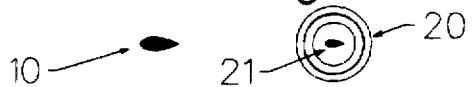
Figure 4C:
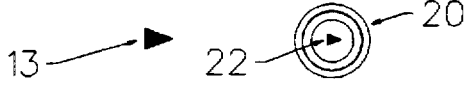
Figure 6A:
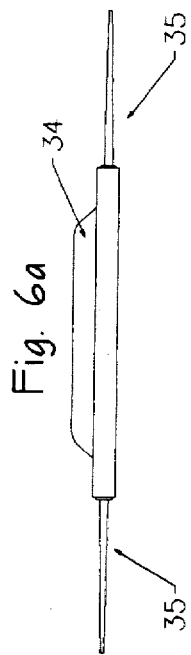
Figure 6B:
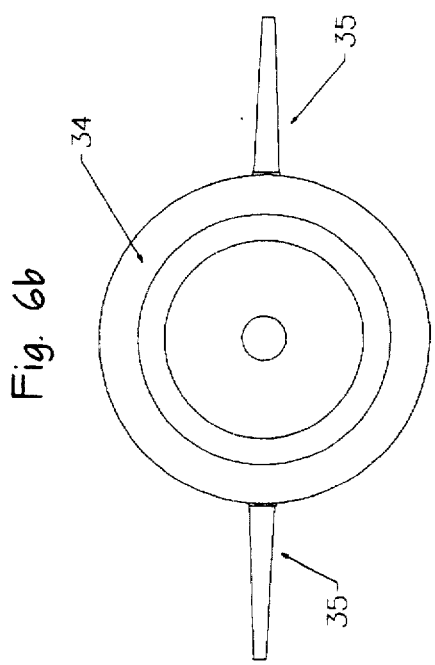
Figure 6C:
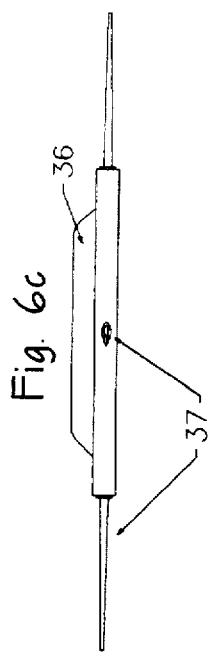
Figure 6D:
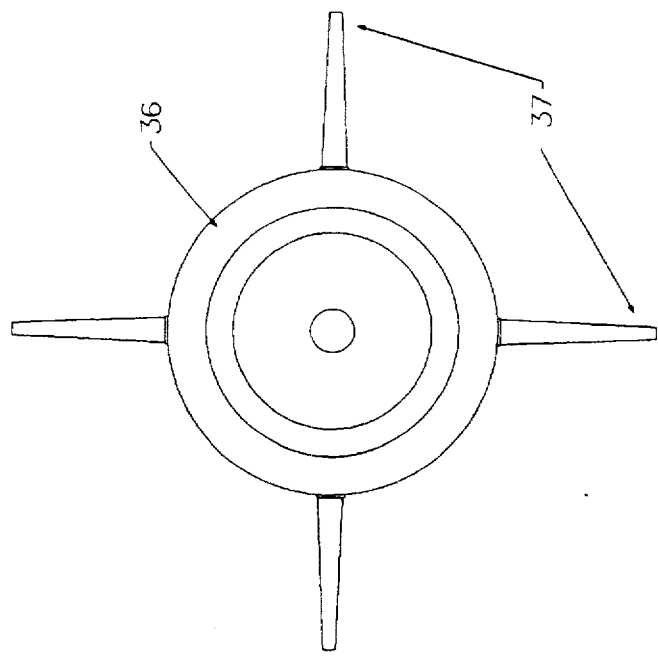

FIGS. 4a–4h show different eyelets 20 according to the invention, the eyelet configurations, such as the configurations 10, 13 as seen in FIGS. 4a and 4b, and FIGS. 4c, respectively, corresponding to the same shapes as the cutting string cross-sections illustrated in FIGS. 3a–3h, respectively. That is the eyelets 21 in FIGS. 4a and 4b have tear drop and reverse tear drop configurations, the eyelet 22 in FIG. 4c a triangular configuration, the eyelet 23 in FIG. 4d a 6:1 ellipse configuration, the eyelet 24 in FIG. 4e an 8:1 ellipse configuration, the eyelet 25 in FIG. 4f a 2:1 ellipse configuration, the eyelet 26 in FIG. 4g a 3:1 ellipse configuration, and the eyelet 27 in FIG. 4h a 4:1 ellipse configuration.

Figure 7:
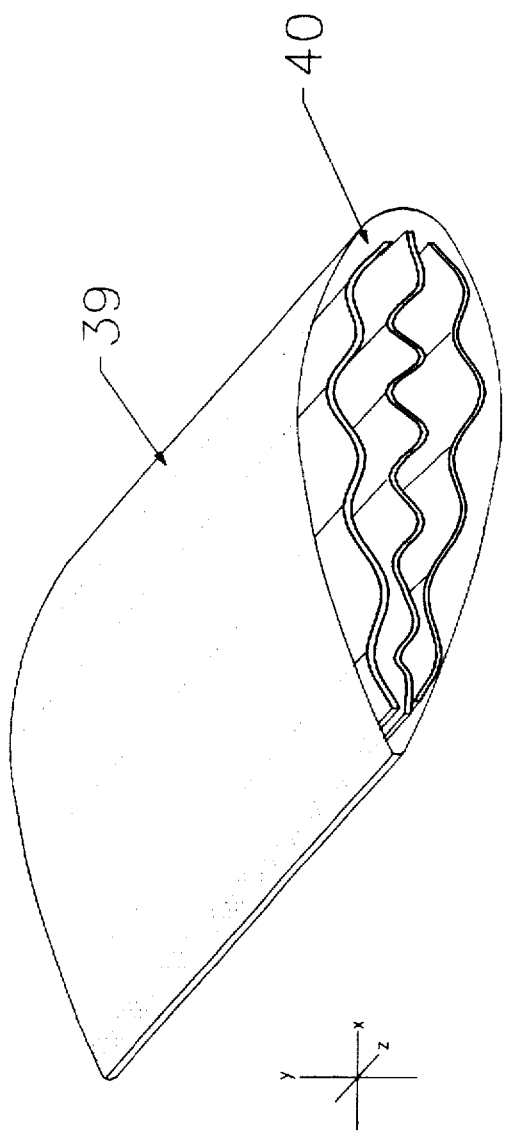
FIGS. 7 and 8 illustrate various methods of manufacturing an aerodynamic string to increase abrasion resistance in accordance with the present invention.
Figure 8:
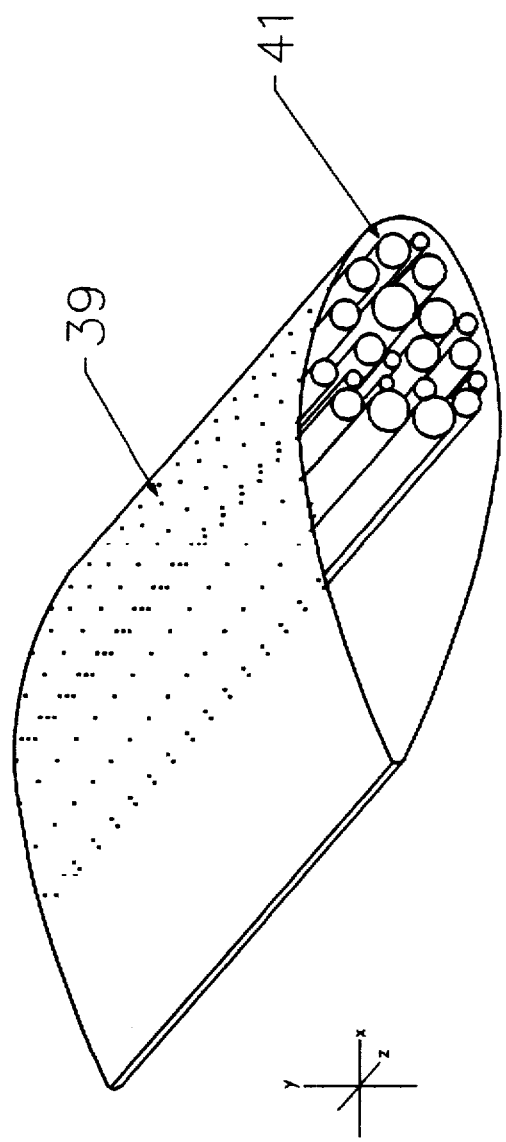
Figure 9:
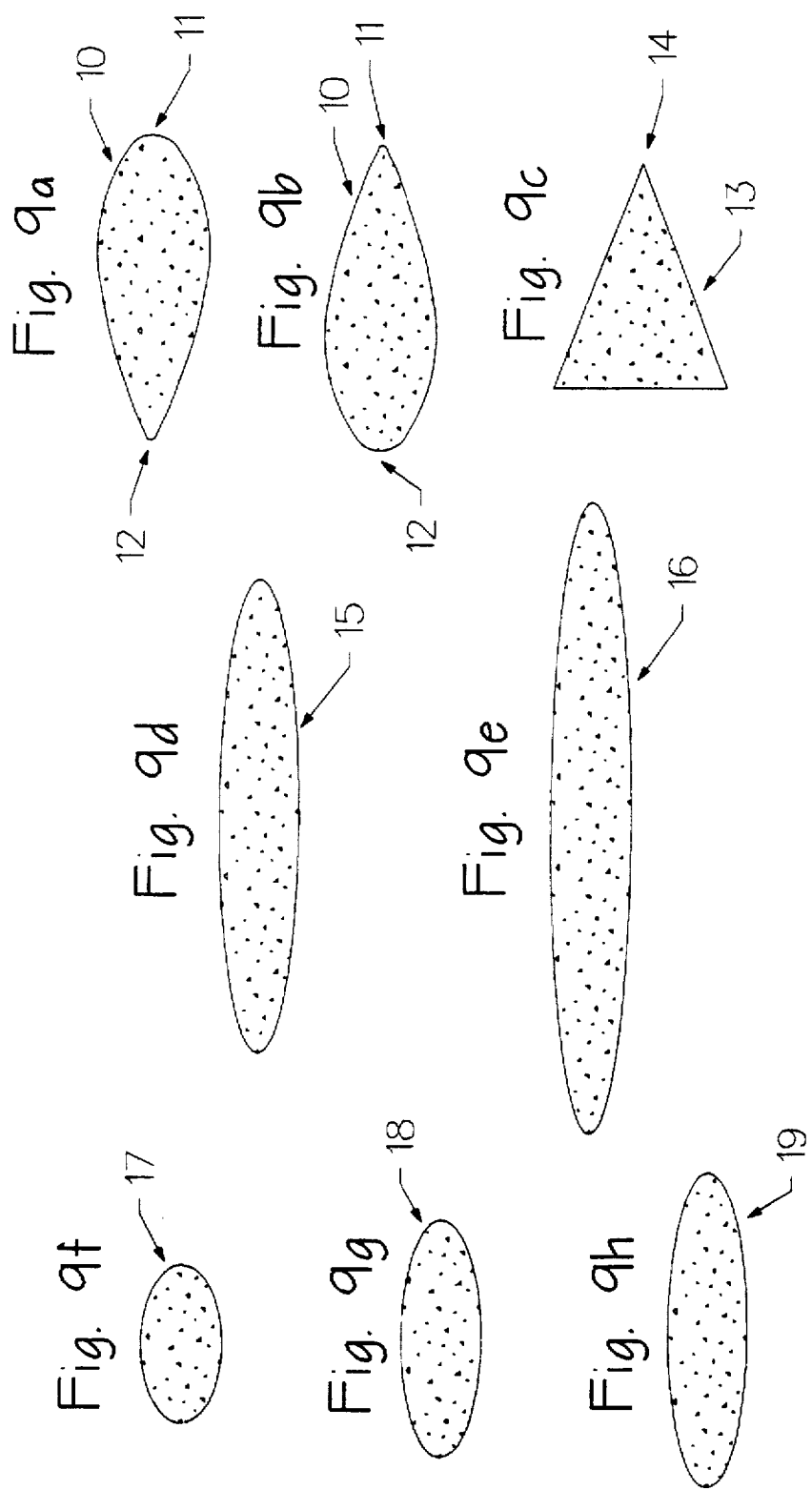
FIGS. 9a–9h illustrates various shapes created with a high strength extruded polymer reinforced with high strength fibers.

The cutting line of Applicants' invention can be made of high strength polymer or other material having similar characteristics. FIGS. 7 and 8 illustrate various techniques of manufacturing aerodynamic line having high strength characteristics. With the rise of polymers and other high strength materials, the line can be made to have a longer wear pattern. As FIG. 7 shows, the line 39 is strengthened with a plurality of reinforcing ribs 40. In FIG. 8, is the line 39 is strengthened with a plurality of reinforcing rods 41.

FIGS. 9a–9h correspond, respectively, to FIGS. 3a–3h as far as the configuration of the lines 10, 13, and 15 through 19 illustrated therein are concerned. The only difference between the lines 10, 13, and 15 through 19 illustrated in FIGS. 9a–9h and their counterparts in FIGS. 3a–3h is that the lines in FIGS. 9a–9h comprise high strength extruded polymer reinforced with high strength fibers (similar to the embodiments illustrated in FIGS. 7 and 8).

Figure 10:
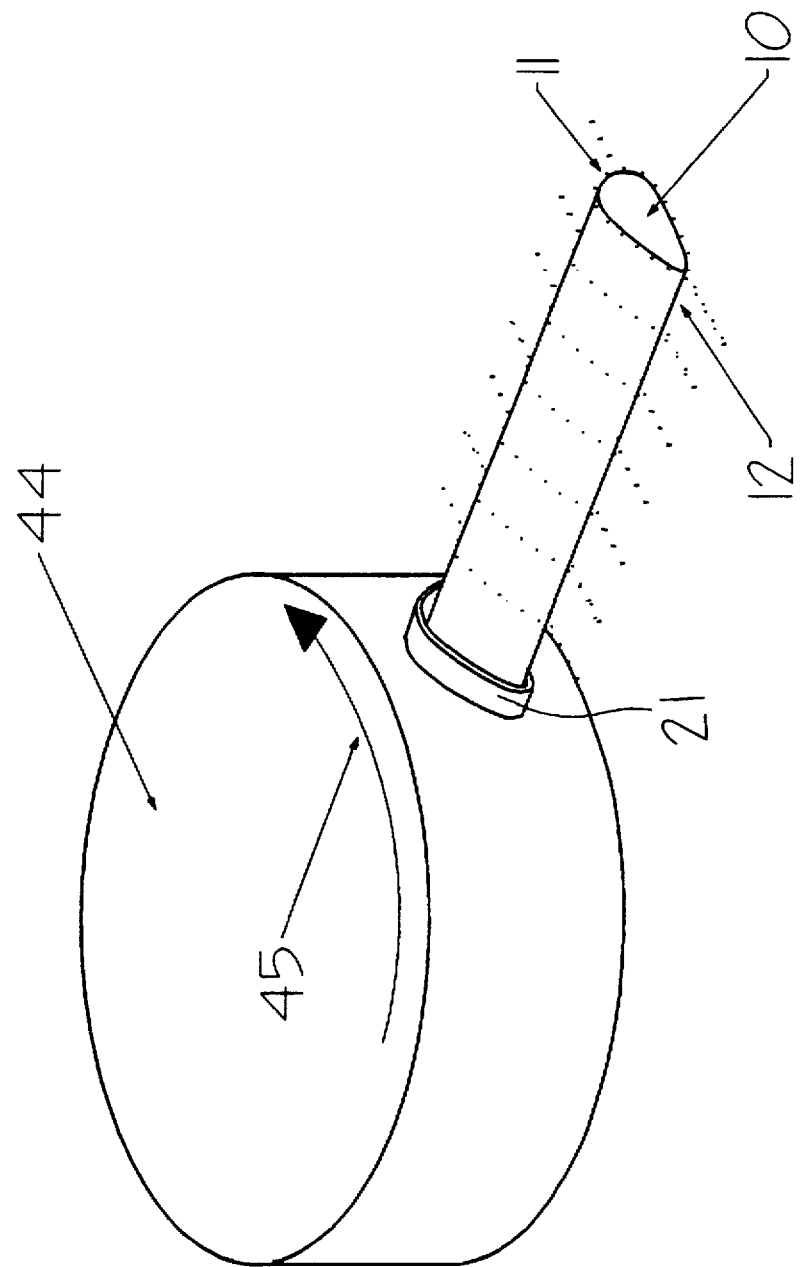
FIG. 10 illustrates the flow of air over the aerodynamic line and the lack of pressure differential and associated wake.

FIG. 10 illustrates the flow of air over the aerodynamic string of Applicants' invention and the lack of pressure differential and wake disturbances. In FIG. 10 a rotating device 44 is rotating in direction 45 and has a cutting string 10 according to the invention which extends from the eyelet 21 connected to the rotating device 44.

During testing, Applicants discovered that different sizes and shapes of string, e.g. 10, greatly affects motor fuel consumption. Tests were conducted on a Husqvarna 120LC string trimmer. The tests consisted of placing two ounces of gasoline fuel mix in the tank, installing two feet of various string types on the trimmer head, running the motor at 6750 RPM in open air, and measuring the time the fuel was consumed. Each string was measured out 5.5 inches past its head eyelet, e.g. 21, so that the strings had equal cutting diameters. Thus, the test allowed calculation of the approximate engine fuel consumption rate based on each type of string used. The strings used were 0.065 round, 0.080 round, 0.080 star, 0.095 round, 0.095 square, and 0.130 round.

Figure 11:
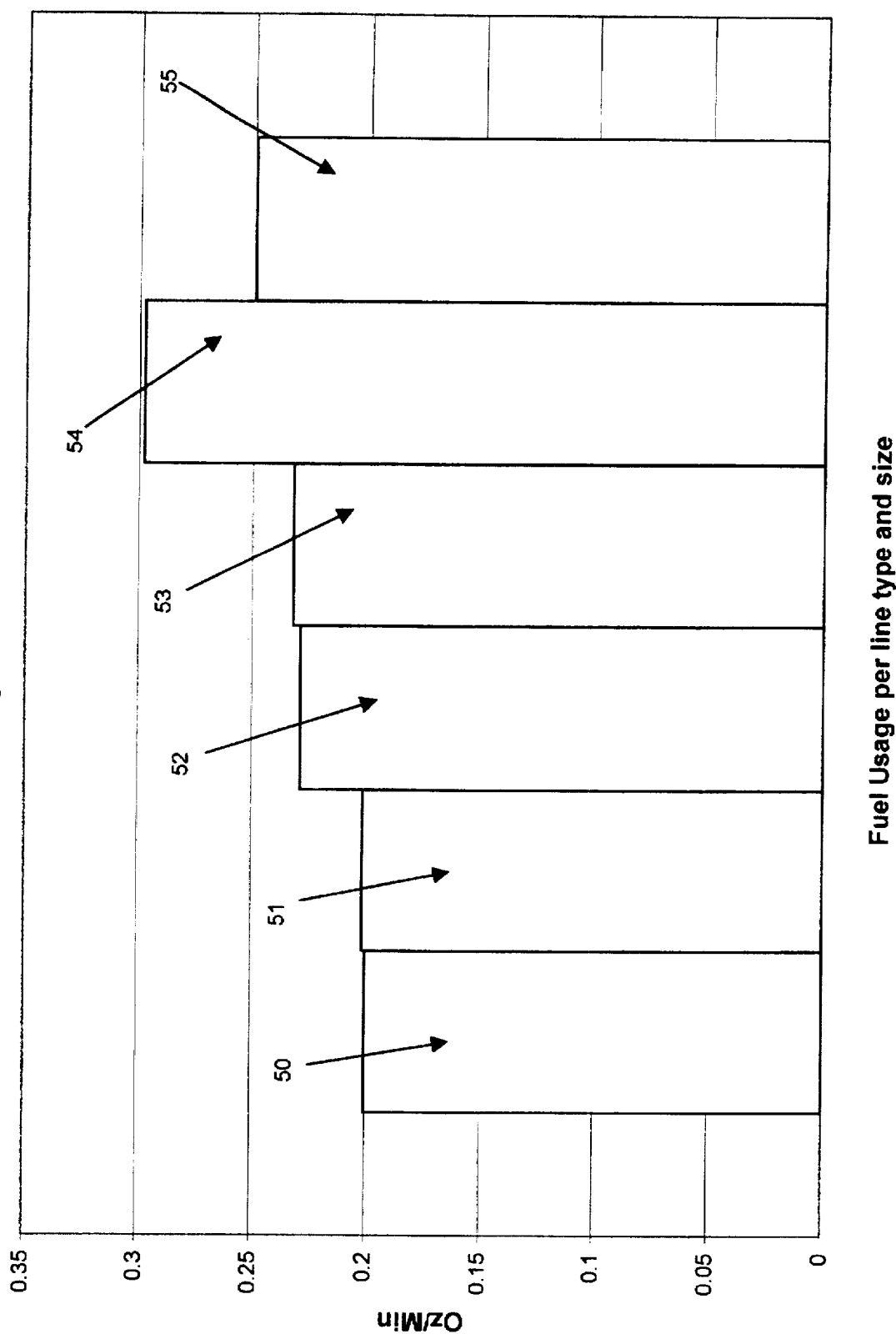
FIGS. 11 to 14 show various comparisons with respect to fuel consumption and air drag when using different sizes and cross sections of cutting line.
Figure 12:
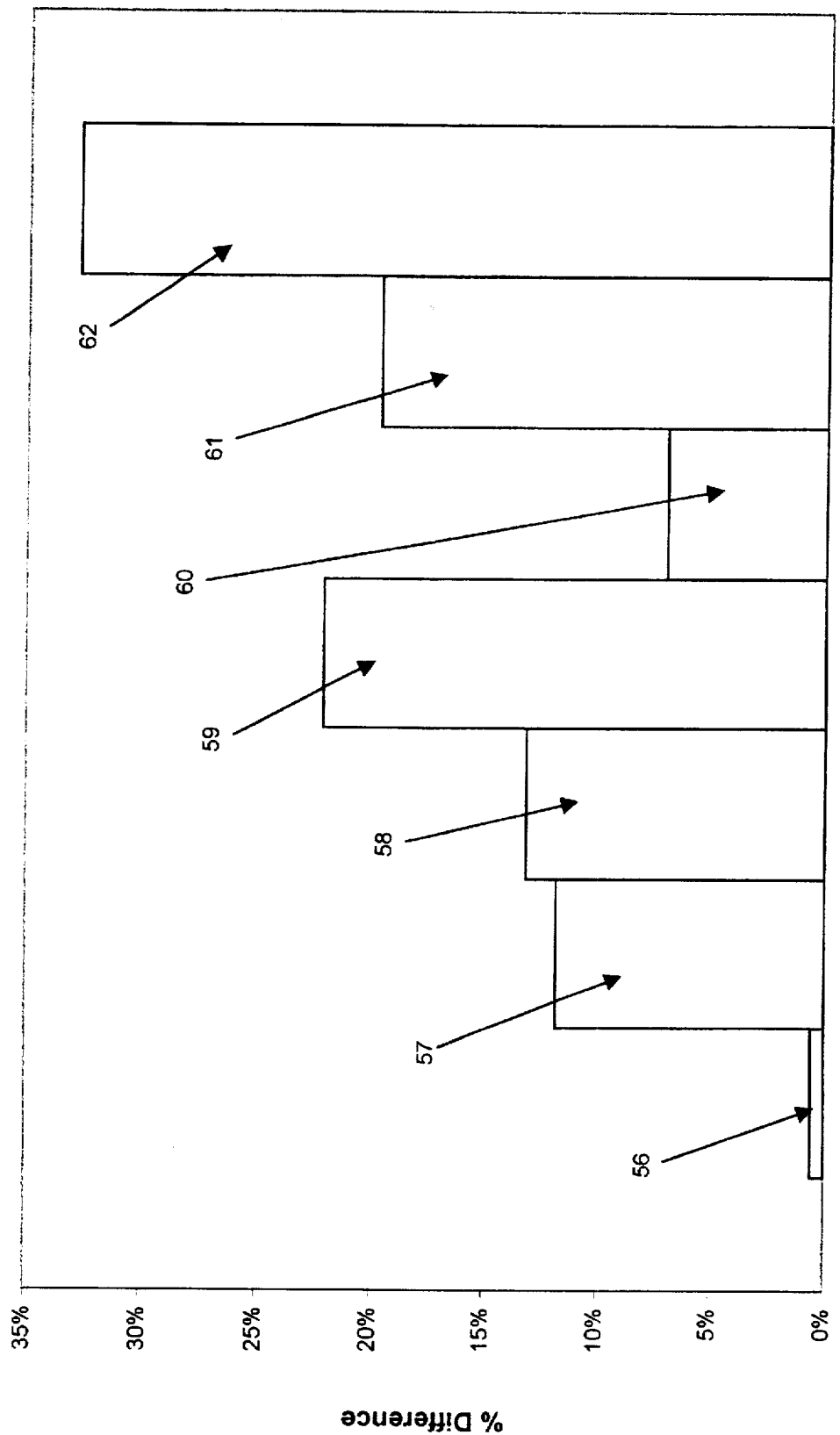

FIG. 11 plots fuel usage in ounces per minute on the Y axis, and a line type and size on the X axis. Graphical representation 50 is for the 0.065 inch diameter round line, graph 51 for the 0.080 round line, graph 52 for the 0.080 star line, graph 53 for the 0.095 round line, graph 54 for the 0.095 square line, and graph 55 for the 0.130 round line. As illustrated in FIG. 11, the 0.095 square line consumed the most fuel, while the 0.065 round line consumed the least. FIG. 11 also shows that more rectangular shaped strings consumed more fuel than their round counterparts. FIG. 12 plots the percentage difference of fuel usage per line type versus the line type and size, for the tests conducted with a Husqvarna 120LC/Shindaiwa Head Line Trimmer. Graph 56 plots the 0.080 inch diameter round line versus a 0.060 round line, graph 57 the 0.080 round line versus the 0.080 star line, graph 58 the 0.095 round line versus the 0.080 round line, graph 59 the 0.095 square line versus the 0.095 round line, graph 60 the 0.130 round line versus the 0.095 round line, graph 61 the 0.130 round line versus the 0.065 round line, and graph 62 the 0.095 square line versus 0.065 round line. FIG. 12 also shows the more rectangular shaped strings consume more fuel than the round counterparts. For example, as shown in FIG. 12, 0.080 star line consumed 13% more fuel than the 0.080 round line, while the 0.095 square line consumed 22% more fuel than the 0.095 round line.

Another test was conducted in order to show the effect of air drag using different types of strings. In this test, each string was installed on the trimmer head and also extended 5.5 inches past its corresponding eyelet (e.g. 21). The motor was then started and brought up to maximum RPM. The maximum RPM was recorded for each string.

Figure 13:
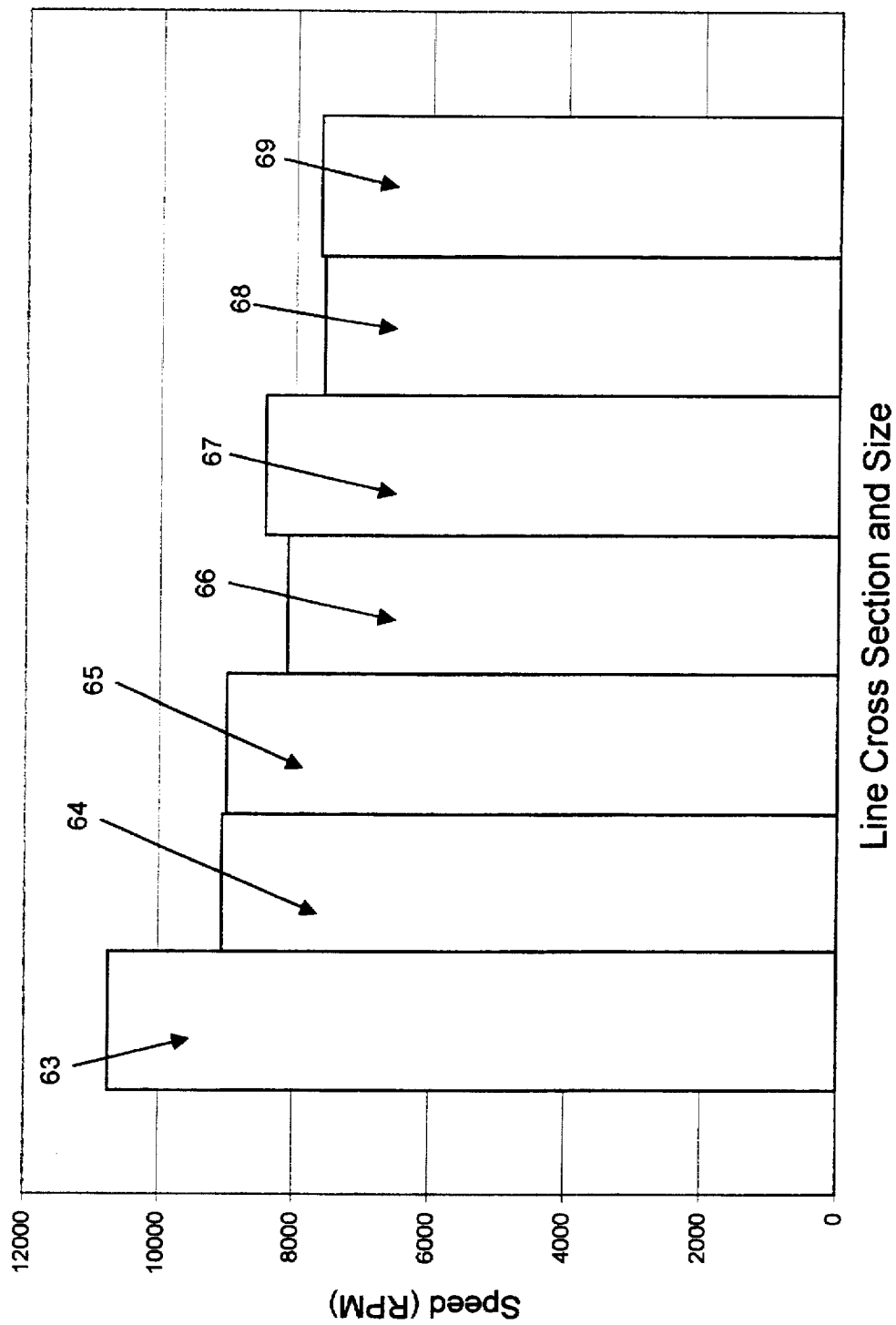

FIG. 13 plots rpm versus a line cross-section and size. Graph 63 is for when there was no line on the head, graph 64 plots a 0.065 round line, graph 65 a 0.080 round line, graph 66 a 0.080 star line, graph 67 a 0.095 round line, graph 68 a 0.095 square line, and graph 69 a 0.130 round line. FIG. 13 shows that the highest RPM occurred when, of course, there was no string on the head. FIG. 13 also shows that the highest RPM with a string in place was with the 0.065 round line while the lowest RPM was with the 0.095 square line. FIG. 13 establishes that line air drag can considerably slow down engine RPM, all the way from 11,000 RPM (graph 63) to 7500 RPM (graph 68).

Figure 14:
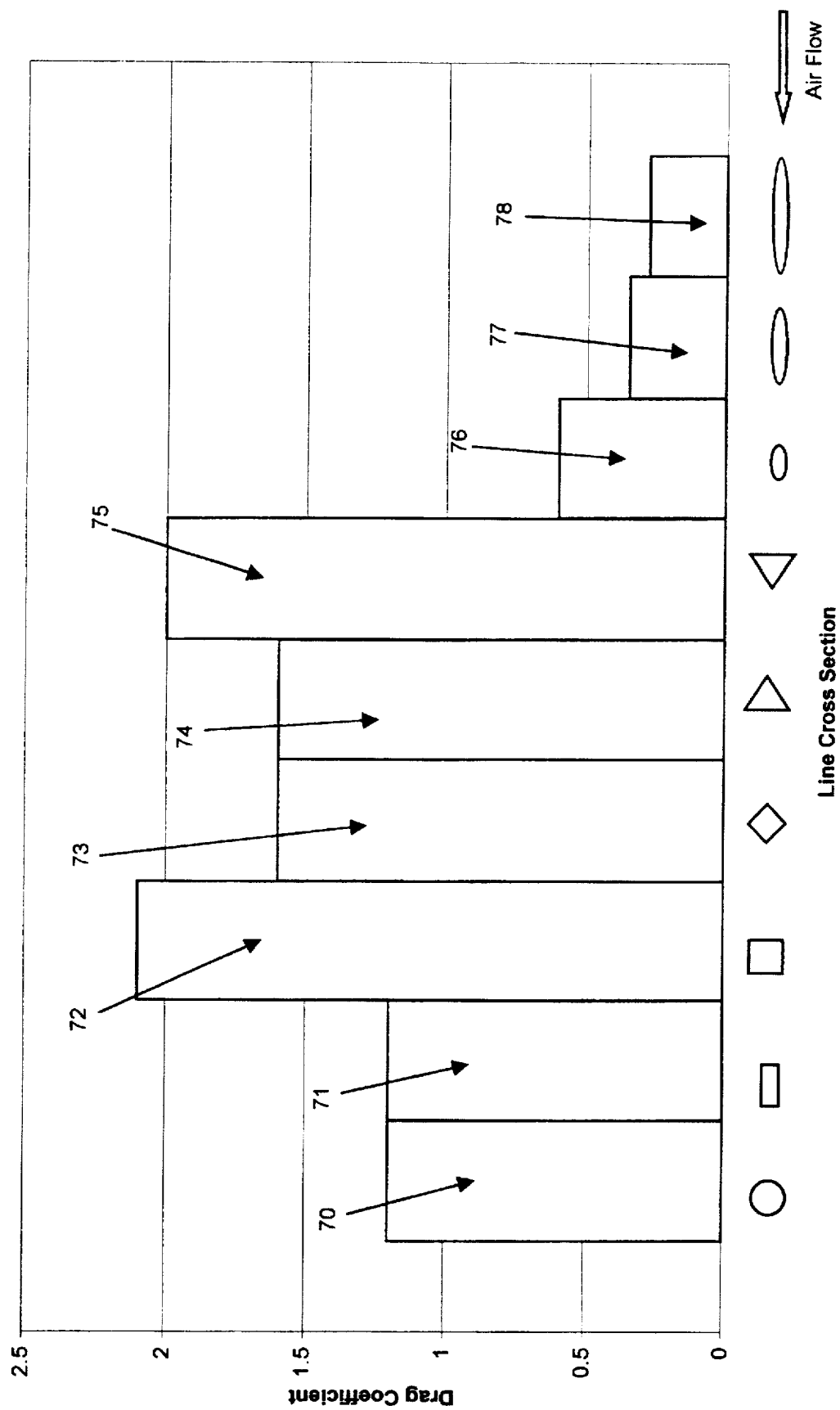

FIG. 14 provides a comparison between the drag coefficients of different shapes laminar flow. As FIG. 14 illustrates, cutting lines with an elliptical shape have the lowest coefficient of drag.

That is FIG. 14 plots drag co-efficient versus line cross-section. Underneath each of the graph bars 70–78 the configuration of the particular string cross-section tested is illustrated. For example bar graph 70 is for a completely round cross-section line, graph 71 for a rectangular line, graph 72 a flat face square, graph 73 a corner square, graph 74 a flat face triangle, graph 75 a corner triangle, graph 76 a 2:1 ellipse, graph 77 a 4:1 ellipse, and graph 78 an 8:1 ellipse. The air flow direction also is illustrated in the legend on the X axis of FIG. 14.

Applicants' tests establish that the use of an aerodynamic string in accordance with the present invention provides the following advantages:

(1) Fuel Savings—Can potentially be very large due to overall usage of flexible line trimmers, both in the private and commercial sectors. Smaller horsepower engines, lower speed of line, etc. will result, thus further realizing the fuel savings benefit.

(2) Increased Durability—Increased cutting plane length of aerodynamic cutting line decreases stress on line, as well as, increases length of line in the cutting plane.

(3) Lower Emissions—Lower fuel usage in the consumer and commercial sectors will reduce overall emissions to the atmosphere caused by gasoline/oil mix combustion used to drive the string trimmers.

(4) OEM Cost Reduction—Lower cost models with comparable cutting efficiency will be achievable by OEM's, as well as competitive advantage in the marketplace.

(5) Decreased Noise—Reduced engine speed will provide decreased noise, as will reduction of whirling noise created by less aerodynamic cutting lines. This effect brought about by aerodynamic string will benefit both users of flexible line trimmers and nearby bystanders, and support compliance with stricter limits on noise in cities.

In accordance with the present invention described above, Applicants' line cutting string greatly reduces the effects of aerodynamic drag associated with the moving string. Reducing the effects of aerodynamic drag leads to a number of important benefits. These benefits include reduced wear and tear on, for example, the eyelet through which the string is dispensed and the bearings around which the head rotates. Moreover, Applicants' aerodynamic cutting string provides a superior design for cutting grass and weeds. The line has particular application in cutting along fences and around trees, shrubs, and buildings to help manicure the lawn. Further, it can be used to cut weeds in uncultivated areas, such as sanitary ditches and prairies.

The aerodynamic string of Applicants' invention may be used with a wide variety of grass and weed cutting apparatus.

While the well-known flexible line trimmer is one obvious application for Applicants' string, the string may also be used with out-board trimmer devices attached to lawn mowers and the like.

Moreover, in recent years, trimmer devices on wheels have been introduced to the market place. Such devices generally resemble a conventional four-wheel lawn mower but rather than a metal cutting blade, a string cutting line is employed. While wheeled cutting trimmers offer certain advantages over hand-held trimmers, wheeled trimmers continue to use prior art cutting strings with all of their inherent deficiencies as discussed above. Accordingly, use of the aerodynamic string of Applicants' invention can be used to provide four-wheeled trimmer with the same benefits as described above with respect to manual trimmers.

Many variations and modifications of the above described embodiments of the present invention will become apparent to those of ordinary skill in the art from a reading of this disclosure. It should be realized that the invention is not limited to the particular apparatus disclosed, but its scope is intended to be governed only by the scope of the appended claims.

We claim:

1. A device for cutting grass and weeds, said device comprising:

rotating means for rotating;

drive means for rotationally driving said rotating means;

attachment means for attaching said rotating means to said device; and an elongated cutting string carried by said rotating means for cutting said grass and weeds, wherein said string is formed with a radial cross section having a profile which is generally elliptical in shape, wherein said profile has a height, a width and a center, said center being defined as the intersection of the mid point of said width with the mid point of said height at its highest point along said profile and wherein said height continuously varies by different amounts on both sides of said center between said center and corresponding end points of said width.

2. A device for cutting grass and weeds as recited in claim 1 wherein said elongated cutting string is made of high strength polymer.

3. A device for cutting grass and weeds as recited in claim 1 wherein said elongated cutting string is made of high strength polymer reinforced with high strength fibers.

4. An improvement in an elongated cutting string connectable to a rotating device for cutting grass and weeds, wherein said improvement comprises said string having a radial cross section having a profile with a height, a width, and a center, said center being defined as the intersection of the mid point of said width with the mid point of said height at its highest point along said profile and said height continuously varying by different amounts on both sides of said center between said center and corresponding end points of said width.

5. An improvement in an elongated cutting string as recited in claim 4 wherein said cutting string is made of high strength polymer.

6. An improvement in an elongated cutting string as recited in claim 4 wherein said cutting string is made of high strength polymer reinforced with high strength fibers.

7. An improvement in an elongated cutting string connectable to a rotating device for cutting grass and weeds, wherein said improvement comprises said string having a radial cross section having a profile which is generally tear-drop in shape.

8. An improvement in an elongated cutting string as recited in claim 7 wherein said cutting string is made of high strength polymer.

9. An improvement in an elongated cutting string as recited in claim 7 wherein said cutting string is made of high strength polymer reinforced with high strength fibers.

* * * * *